United States Patent
Gatzke et al.

(10) Patent No.: US 12,353,796 B2
(45) Date of Patent: Jul. 8, 2025

(54) CONTROLLING AUDIBILITY OF VOICE COMMANDS BASED ON EYE GAZE TRACKING

(71) Applicant: Cisco Technology, Inc., San Jose, CA (US)

(72) Inventors: Alan D. Gatzke, Bainbridge Island, WA (US); Tyrone Terry Thorsen, Seattle, WA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 391 days.

(21) Appl. No.: 18/069,611

(22) Filed: Dec. 21, 2022

(65) Prior Publication Data

US 2024/0211204 A1    Jun. 27, 2024

(51) Int. Cl.
G06F 3/16    (2006.01)
G06F 3/01    (2006.01)
H04N 7/15    (2006.01)

(52) U.S. Cl.
CPC ........... *G06F 3/167* (2013.01); *G06F 3/013* (2013.01); *G06F 3/165* (2013.01); *H04N 7/157* (2013.01)

(58) Field of Classification Search
CPC .......... G06F 3/167; G06F 3/013; G06F 3/165; H04N 7/157
See application file for complete search history.

(56) References Cited

U.S. PATENT DOCUMENTS

| | | | |
|---|---|---|---|
| 6,795,806 B1* | 9/2004 | Lewis | G06F 3/167 704/E15.044 |
| 8,670,019 B2 | 3/2014 | Byers | |
| 8,947,493 B2 | 2/2015 | Lian et al. | |
| 9,979,929 B2* | 5/2018 | Baldwin | G10L 15/22 |

(Continued)

FOREIGN PATENT DOCUMENTS

WO    2018112643 A1    6/2018

OTHER PUBLICATIONS

Jianbo Zhao, et al., "Design of a high-resolution holographic waveguide eye-tracking system operating in near-Infrared with conventional optical elements," Research Article, Optics Express 24536, vol. 29, No. 15, Jul. 19, 2021, 16 pages.

(Continued)

*Primary Examiner* — Brian L Albertalli
(74) *Attorney, Agent, or Firm* — Edell, Shapiro & Finnan, LLC

(57) ABSTRACT

Provided herein are techniques to facilitate controlling audibility of voice commands spoken in a video conference based on eye gaze tracking. A method may include tracking an eye gaze of the participant in relation to voice-enabled user interface objects provided by the video headset and determining that the participant is not an active speaker for the video conference and has an eye gaze towards a particular voice enabled user interface object. Upon the participant speaking a particular voice command associated with the particular voice-enabled user interface object while the participant is not the active speaker for the video conference and has the eye gaze towards the particular voice-enabled user interface object, the method may include inhibiting the particular voice command that is spoken by the participant from being heard by other participants of the video conference.

20 Claims, 5 Drawing Sheets

(56) References Cited

U.S. PATENT DOCUMENTS

| | | | | |
|---|---|---|---|---|
| 10,388,325 | B1* | 8/2019 | Badash | G11B 27/031 |
| 11,082,465 | B1* | 8/2021 | Chavez | G06V 40/20 |
| 11,257,511 | B1* | 2/2022 | Peeler | G10L 25/57 |
| 2010/0208078 | A1 | 8/2010 | Tian et al. | |
| 2013/0307771 | A1* | 11/2013 | Parker | G06F 3/167 |
| | | | | 345/158 |
| 2015/0109191 | A1 | 4/2015 | Johnson et al. | |
| 2017/0098453 | A1 | 4/2017 | Wright et al. | |
| 2017/0374486 | A1 | 12/2017 | Killham et al. | |
| 2018/0366118 | A1* | 12/2018 | Lovitt | G10L 15/063 |
| 2019/0251961 | A1* | 8/2019 | Wang | G10L 15/1815 |
| 2019/0279636 | A1* | 9/2019 | Woodall | G06F 3/011 |
| 2019/0333508 | A1* | 10/2019 | Rao | G10L 15/25 |
| 2020/0103963 | A1* | 4/2020 | Kelly | G06F 3/0487 |
| 2020/0105260 | A1* | 4/2020 | Piernot | G06F 3/04886 |
| 2020/0110572 | A1* | 4/2020 | Lenke | G06F 3/167 |
| 2020/0209957 | A1 | 7/2020 | Sztuk et al. | |
| 2020/0219501 | A1 | 7/2020 | Cartwright et al. | |
| 2020/0227034 | A1* | 7/2020 | Summa | G10L 15/22 |
| 2022/0068032 | A1 | 3/2022 | Ng et al. | |
| 2022/0108692 | A1* | 4/2022 | Parkinson | G10L 15/08 |
| 2022/0383869 | A1* | 12/2022 | Yabas | G06F 40/211 |
| 2023/0336689 | A1* | 10/2023 | Peck | H04N 7/147 |
| 2024/0073049 | A1* | 2/2024 | Hamlin | H04L 12/1822 |
| 2024/0094976 | A1* | 3/2024 | Kleinhout | G10L 25/57 |

OTHER PUBLICATIONS

Schweigert, et al., "EyePointing: A Gaze-Based Selection Technique," Posters, https://doi.org/10.1145/3340764.3344897, Sep. 8, 2019, 5 pages.

Bill Toulas, "Real-time voice concealment algorithm blocks microphone spying," Blepping Computer, https://www.bleepingcomputer.com/news/security/real-time-voice-concealment-algorithm-blocks-microphone-spying/, Apr. 19, 2022, 16 pages.

Sostel et al., "Gaze and commit," Microsoft, https://learn.microsoft.com/en-us/windows/mixed-reality/design/gaze-and-commit, Sep. 22, 2022, 14 pages.

"Webex Hologram," Cisco, https://projectworkplace.cisco.com/capabilities/hologram, retrieved from the Internet Oct. 19, 2022, 2 pages.

"Microsoft HoloLens," Microsoft, https://learn.microsoft.com/en-us/hololens/, retrieved from the Internet Oct. 19, 2022, 3 pages.

Hak0n et al., "Voice input," Microsoft, https://learn.microsoft.com/en-us/windows/mixed-reality/design/voice-input, retrieved from the Internet Oct. 19, 2022, 14 pages.

Sostel et al., "Eye tracking on HoloLens 2," Microsoft, https://learn.microsoft.com/en-us/windows/mixed-reality/design/eye-tracking, retrieved from the Internet Oct. 19, 2022, 10 pages.

Microsoft HoloLens, "Microsoft HoloLens: Gaze Input," Youtube, https://www.youtube.com/watch?v=zCPiZIWdVws, Feb. 29, 2016, 2 pages.

Cullen Jennings, "Behind the Innovation of Webex Hologram," Webex Blog, https://blog.webex.com/engineering/behind-webex-hologram/amp/, retrieved from the Internet Dec. 21, 2022, 9 pages.

Christian Kromme, "Cisco's Webex Hologram: Taking Virtual Meetings to a Whole New Level," LinkedIn, https://www.linkedin.com/pulse/ciscos-webex-hologram-taking-virtual-meetings-whole-new-kromme/?trk=pulse-article_more-articles_related-content-card, Jul. 5, 2022, 5 pages.

"Cisco Launches Webex Hologram, An Augmented Reality Meeting Solution," Cisco, Press Release, https://newsroom.cisco.com/c/r/newsroom/en/us/a/y2021/m10/wx1-hologram-release-placeholder.html, Oct. 26, 2021, 5 pages.

* cited by examiner

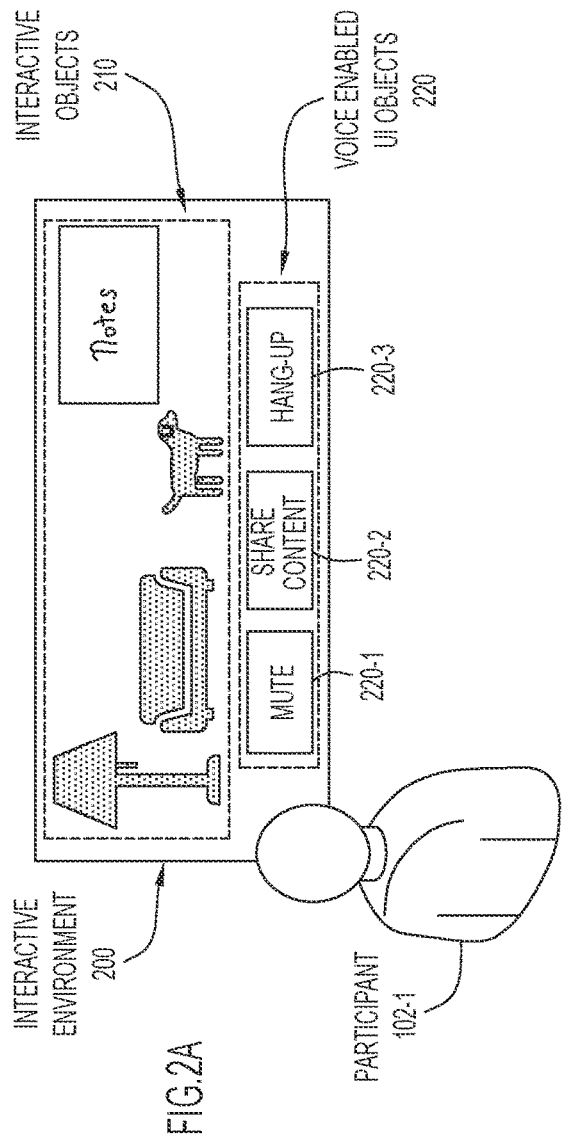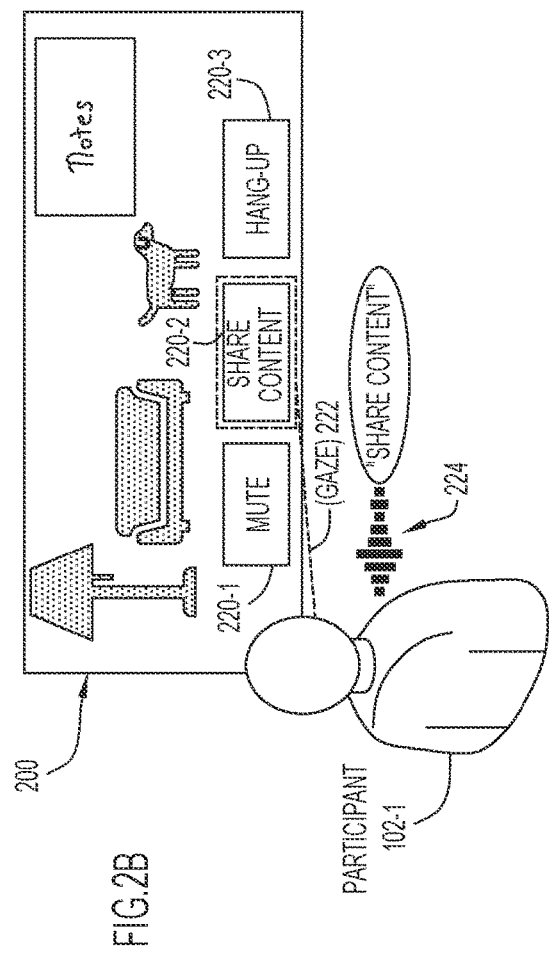

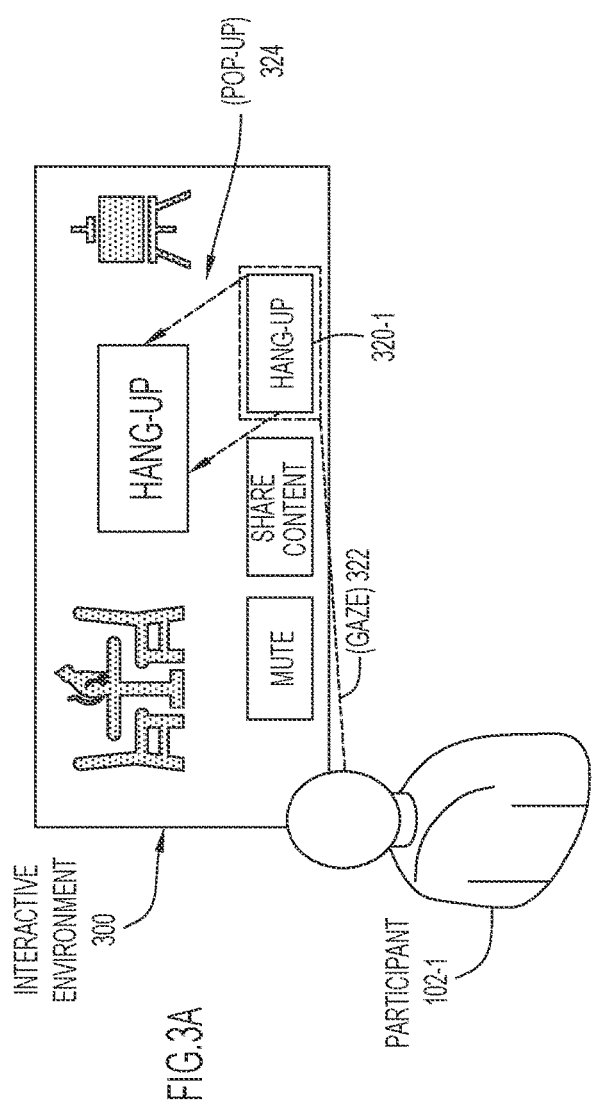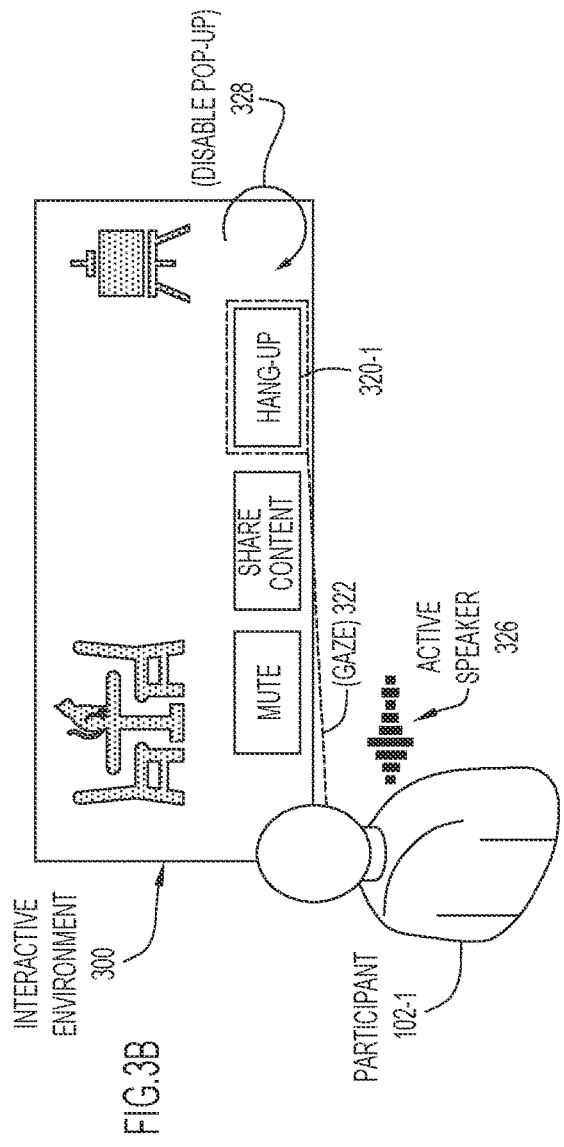

CONTROLLING AUDIBILITY OF VOICE COMMANDS BASED ON EYE GAZE TRACKING

TECHNICAL FIELD

The present disclosure relates to video conferencing equipment and services.

BACKGROUND

Voice commands can be useful in various application environments, such as in augmented reality (AR) or virtual reality (VR) applications. There are challenges, however, in utilizing voice commands in an application environment in which multiple users are simultaneously collaborating, as such voice commands can be distracting to other users of the application.

BRIEF DESCRIPTION OF THE DRAWINGS

FIGS. 2A and 2B are diagrams of illustrating example features of an example interactive environment that may be provided by a video headset in which the interactive environment may include one or more voice-enabled user interface (UI) objects that can be activated via a video headset, according to an example embodiment.

FIGS. 3A and 3B are diagrams illustrating example features of an example interactive environment that may be provided by a video headset, according to an example embodiment.

DETAILED DESCRIPTION

Overview

Provided herein are techniques through which, during a video conference involving multiple participants (e.g., a meeting, a group chat, etc.) in which a given participant is utilizing a three-dimensional (3D) video headset, audibility of voice commands spoken by the given participant may be inhibited or prevented from being heard by other participants of the video conference. For example, a voice command spoken by the given participant for a voice-enabled user interface (UI) object (e.g., a UI button/menu option) presented in a 3D interactive environment (e.g., a 3D augmented reality (AR) and/or virtual reality (VR) interactive environment) can be removed from audio that is heard by the other participants of the video conference when the given participant is gazing at the voice-enabled UI and the given participant is not currently the active speaker in the video conference.

In one embodiment, for example, a computer-implemented method is provided that may include, for a participant in a conference in which the participant is participating in a video conference using a video headset, tracking an eye gaze of the participant in relation to one or more voice-enabled user interface objects for an interactive environment provided to the participant via the video headset, wherein each corresponding voice-enabled user interface object of the one or more voice-enabled user interface objects is associated with a corresponding voice command that can be spoken by the participant in order to perform one or more actions within the video conference; determining that the participant is not an active speaker for the video conference and has an eye gaze towards a particular voice-enabled user interface object; and upon the participant speaking a particular voice command associated with the particular voice-enabled user interface object while the participant is not the active speaker for the video conference and has the eye gaze towards the particular voice-enabled user interface object, inhibiting the particular voice command that is spoken by the participant from being heard by other participants of the video conference. In one instance, the interactive environment is a three-dimensional (3D) virtual reality interactive environment or is a 3D augmented reality interactive environment.

Example Embodiments

Figure 1:
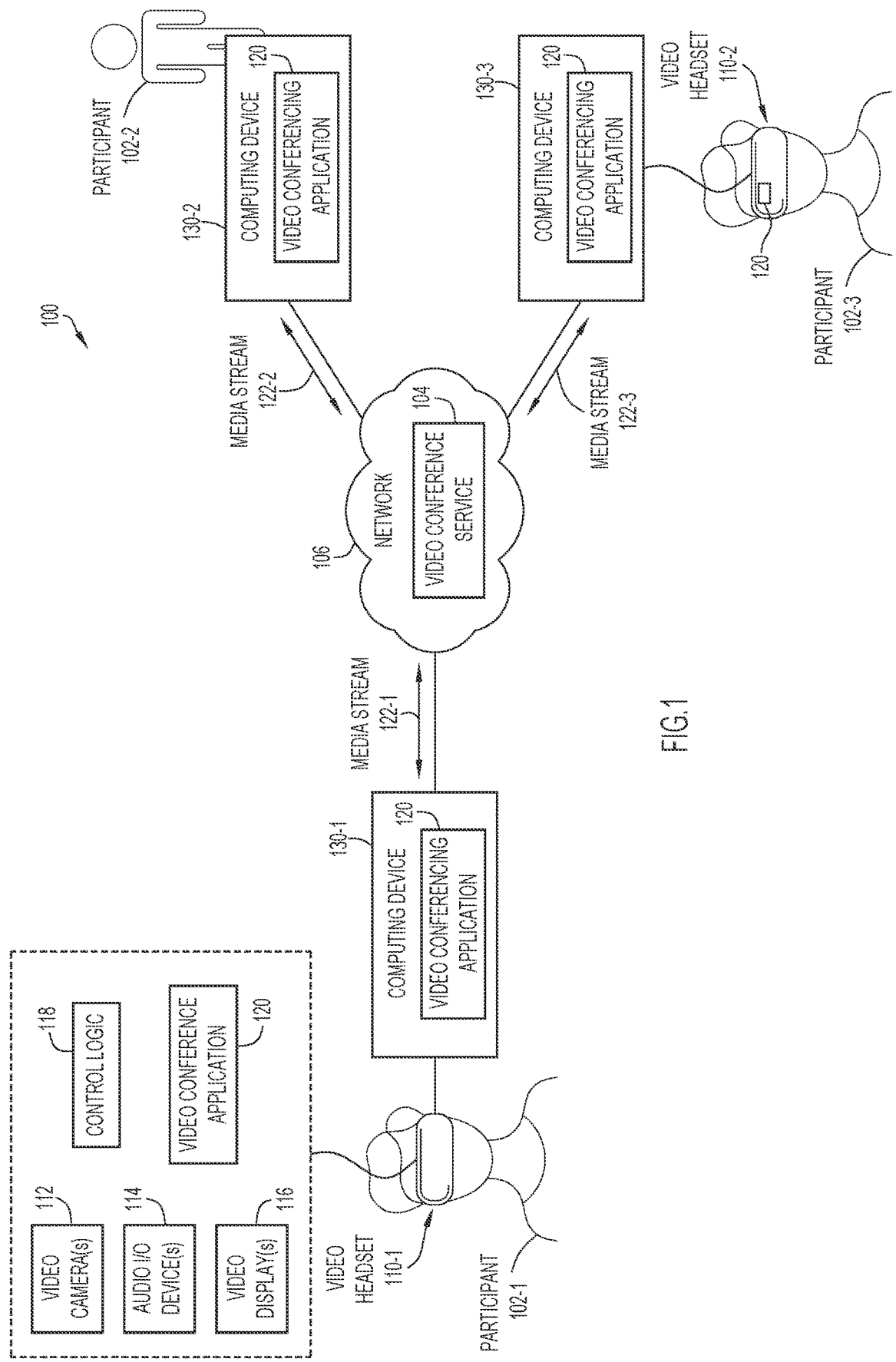
FIG. 1 is a block diagram of a system that may be utilized to control the audibility of voice commands from based on eye gaze tracking, according to an example embodiment.

Referring to FIG. 1, FIG. 1 is a block diagram of a system 100 that may be utilized to control audibility of voice commands spoken in a video conference, according to an example embodiment. For example, system 100 may provide for inhibiting or preventing voice commands spoken by a particular participant of a video conference from being heard by other participants of the video conference based on eye gaze tracking for a video headset utilized by the particular participant, according to an example embodiment. FIG. 1 includes multiple users or participants that are participating in a video conference, such as a participant 102-1, a participant 102-2, and a participant 102-3. The video conference can be facilitated by a video conference service 104, which can be hosted or provided via a network 106, such as the Internet, a wide area network (WAN), local area network (LAN), combinations thereof, and/or the like.

Each participant 102-1-102-3 can utilize any combination of hardware/software configurations that may operate or execute a video conference application 120 (or an instance of the video conference application) that interfaces with the video conference service 104 in order to participant in the video conference. In one instance, the video conference service 104 and each video conference application 120 may facilitate a Webex® video conference, as provided by Cisco®. Webex® and Cisco® are registered trademarks of Cisco Systems, Inc. and/or its affiliates in the United States and certain other countries.

In one example, participant 102-1 can utilize a video headset 110-1 and a computing device 130-1 in order to participate in the video conference in which the video headset 110-1 may interface (via a wired and/or wireless connection) with computing device 130-1. Further, participant 102-2 can utilize a computing device 130-2 in order to participate in the video conference. Additionally, participant 102-3 can utilize a headset 110-2 and a computing device 130-3 in order participate in the video conference in which the video headset 110-2 may interface (wired and/or wirelessly) with computing device 130-3.

Each of the video headset 110-1, video headset 110-2, computing device 130-1, computing device 130-2, and computing device 130-3 may be configured with a corresponding video conference application 120 (or instances thereof) which can operate in cooperation with video conference service 104 in order to enables audio, video, and/or data communications (broadly, multimedia communications), generally referred to herein as 'media streams', to be generated among the participants 102-1, 102-2, and 102-3 during the video conference via their corresponding hardware/software configurations. For example, a media stream 122-1 can be generated for communications to/from participant 102-1 for the video conference, a media stream 122-2 can be generated for communications to/from participant 102-2 for the video conference, and a media stream 122-3 can be generated for communications to from participant 102-3 for the video conference.

Referring to participant 102-1, video headset 110-1 may be implemented as a 3D video headset that may be worn by or otherwise affixed to the head of participant 102-1 and may provide 3D interactive augmented reality (AR) and/or virtual reality (VR) interactive environment (3D interactive AR/VR environment), more generally referred to herein as an 'interactive environment' via video display(s) 116 in which the participant 102-1 can operate, manipulate and/or otherwise interact with one or more elements or objects (e.g., user interface (UI) elements/objects, augmented reality elements/objects, environmental objects/elements, objects/elements provided by one or more application(s), combinations thereof, etc.) of an interactive environment presented to the participant via one or more video displays 116 of the video headset 110-1.

In addition to any combination of processor(s), memory element(s), storage, etc. (not shown) that facilitate operations for the video headset 110-1, the video headset 110-1 may further include one or more video cameras 112, and one or more audio input/output (I/O) devices 114 (e.g., microphones, speakers, etc.). Further, video headset 110-1 may be configured with control logic 118 to facilitate tracking eye gaze of the participant 102-1 as the participant 102-1 uses their eyes to look at or gaze towards one or more elements/objects of the interactive environment provided by the video headset 110-1 via the video display(s) 116. Additional features associated with eye gaze tracking of a headset user/video conference participant are discussed in further detail herein, below. Video headset 110-1 may further be configured with video conference application 120 to facilitate various operations as discussed for embodiments herein. In some embodiments, one or more pointing and/or gesture device(s) (not shown), may be utilized by participant 102-1 to operate, manipulate, and/or otherwise interact with elements/objects/etc. of the interactive environment provided by video headset 110-1. Video headset 110-2 may be configured and utilized in any manner similar to video headset 110-1 in accordance with embodiments herein.

Generally, a VR interactive environment can be characterized as a 3D interactive environment in which elements/objects/content of the 3D interactive environment are fully generated/created by the video headset 110-1 and/or one or more applications (e.g., video conference application 120) configured for the video headset 110-1 in which the 3D interactive environment is displayed via the video display(s) 116 of the video headset 110-1 such that participant 102-1 can manipulate, execute, operate, and/or otherwise interact with content/elements/objects displayed for the VR interactive environment. Generally, an AR interactive environment can be characterized as a 3D interactive environment in which some elements/objects/content of the 3D interactive environment are generated/created by the video headset 110-1 and/or one or more applications (e.g., video conference application 120) configured for the video headset 110-1 and can overlay or otherwise augmented/enhance one or more elements/objects of a physical environment in which the participant 102-1 is located (e.g., physical furniture, whiteboards, artwork, etc. contained in a room in which the participant is located). For example, in an AR implementation of video headset 110-1, the video display(s) 116 may be implemented as see-through holographic lenses or waveguides such that the participant 102-1 can see the physical elements/objects of the physical environment in which the participant is located and holographic/hologram images can be overlaid on top of the physical objects via the video display(s) 116 of the video headset 110-1 such that participant 102-1 can manipulate, execute, operate, and/or otherwise interact with interactive content/elements/objects displayed in combination with (e.g., overlaid on top of) the physical objects that are visible to the participant 102-1 via the see-through holographic lenses or waveguides.

In addition to video conference application 120, each of computing devices 130-1, 130-2, and 130-3 may further be configured with combination of processor(s), memory element(s), storage, communication I/O interface(s), video display device(s), audio I/O device(s), etc. (not shown) and may be inclusive of any device that facilitates communications/operations in accordance with embodiments herein, such as a computer, a laptop or electronic notebook, a cellular/Wi Fi enabled telephone/smart phone, tablet, etc. and/or any other device, component, element, or object capable of performing voice, audio, video, media, or data exchanges within system 100. Broadly, video headsets 110-1 and 110-2 may also be considered computing devices that are configured to perform various video headset operations as discussed for embodiments herein.

Eye tracking, also referred to herein as eye gaze tracking, combined with voice command technologies that can facilitate gaze and selection operations of user interface (UI) objects or elements displayed within a 3D video environment by a user of a 3D immersive video headset (generally referred to herein using the term 'gaze and select' features/operations/technology) is a compelling feature that can be provided by 3D video headsets, such as video headsets 110-1 and 110-2. The combination of eye gaze tracking and voice command selection (gaze and select) technology may be used throughout a variety of applications. For example, there are many hands-free use cases that are appealing for any user, but such hands-free use may also be useful in accessibility scenarios for users that are unable to use a traditional mouse/pointing device or are not able to perform hand gestures using a 3D video headset.

In one example, as illustrated in FIG. 1, each of corresponding participants 102-1 and 102-3 can utilize corresponding video headsets 110-1 and 110-2 for the video conference involving participants 102-1, 102-2, and 102-3. For example, consider that participant 102-1 can utilize the video headset 110-1 in order to interact within an interactive environment presented by the video display(s) 116 of the video headset 110-1 for the video conference facilitated by video conference application 120/video conference service 104.

In one instance, the participant 102-1 can navigate and select or execute voice-enabled UI objects within the interactive environment provided by the video headset 110-1 for the video conference, such as voice-enabled UI buttons and/or menu commands using gaze and select operations. For example, during operation of system 100, the participant 102-1 can look at or gaze towards a given voice-enabled UI object that is displayed within an interactive environment displayed via video display(s) 116 of video headset 110-1 and utter or speak a voice command associated with the given voice-enabled UI object in order to cause the video conference application 120 to perform one or more actions within the video conference (e.g., muting the participant via a "Mute" (or similar) voice-enabled UI object displayed in the interactive environment, sharing content for the participant within the video conference via a "Share Content" (or similar) voice-enabled UI object displayed in the interactive environment, enabling the participant to leave the video conference via a "Hang-up" (or similar) voice-enabled UI object displayed in the interactive environment, and/or any other action that may be configured/enabled by the video conference application 120 configured for video headset 110-1).

Eye gaze tracking operations that may be utilized for gaze and select operations may be performed by participant 102-1 wearing video headset 110-1 can be facilitated by cooperation of the operations of the video camera(s) 112, control logic 118, and/or any combination of video conference application 120, and/or video conference service 104. Any eye gaze tracking techniques/logic/algorithms now known in the art or hereafter developed through which control logic 118 and/or video conference application 120 configured for video headset 110-1, video conference application 120 of computing device 130-1, and/or video conference service 104 may be used to determine when participant 102-1 is looking at or gazing towards a particular UI object or element that is being displayed, such as a voice-enabled UI object or element, displayed within an interactive environment displayed via video display(s) 116 of headset 110-1.

Further, voice command detection and/or selection operations that may be utilized for gaze and select operations that may be performed by participant 102-1 wearing video headset 110-1 can be facilitated by cooperation of the operations of the audio I/O device(s) 114, control logic 118, and/or any combination of video conference application 120, and/or video conference service 104. Any voice command detection and action performance techniques/logic/algorithms now known in the art or hereafter developed through which control logic 118 and/or video conference application 120 configured for video headset 110-1, video conference application 120 of computing device 130-1, and/or video conference service 104 may be used to determine when participant 102-1 has, for a particular voice-enabled UI object, spoken a particular voice command and/or has started or is in the process of speaking a particular voice command (e.g., starting a vocal utterance of beginning sound(s) of a particular voice command, such as using predictive speech algorithms/logic) in which the voice command is associated with or otherwise linked to a particular voice-enabled UI object such that speaking or uttering the voice command by the participant 102-1 may cause performance of one or more actions, operations, etc. within the video conference for the participant (e.g., mute, hang-up, share content, etc.). It is to be understood that video headset 110-2 may be configured and operate in a similar manner as video headset 110-1.

Unfortunately, voice commands spoken by a video conference participant could be distracting for other participants of the video conference. For example, a participant could speak a "Mute" command to mute audio from themselves and/or from their background environment (e.g., barking dogs, family, etc.) from being heard by other participants of the video conference.

Once muted, the voice command participant would no longer be a distraction but just saying "Mute" by the participant could interrupt the flow of the video conference, especially when another participant is also talking. In at least one embodiment, one potential solution to address such a problem could be for the video conference application 120 (configured for video headset 110-1 and/or computing device 130-1) and/or video conference service 104 to listen for certain voice command(s) that may be spoken by a given participant and then remove the speech utterance from a media stream that is provided to other participants of the video conference (e.g., removed by the video conference application(s) 120 operating for the participant that speaks the command(s), removed by the video conference application(s) 120 operating for the non-command speaking participants, removed by the video conference service 104, and/or any combination thereof), similar to removing background noise (e.g., a barking dog, etc.) from the media stream. However, it might not always be the intent of a participant to have an utterance of a voice command not be heard by other participants of a video conference. For example, if the video conference were to discuss features associated with a UI object associated with a voice command, such as a 'Mute' UI button, the participants of the video conference would likely not want all utterances of 'Mute' to be automatically removed from the media stream for the video conference.

Instead, it would be more useful if a voice command spoken by a particular participant, such as participant 102-1 participating in the video conference with participants 102-2 and 102-3, could be inhibited or otherwise prevented from being heard by the other participants 102-2 and 102-3 of the video conference if the participant 102-1 of the video headset 110-1 is determined to not currently be an active speaker for the video conference and is determined to be looking at or gazing towards a particular voice-enabled UI object (potentially for a threshold amount of time) of an interactive environment provided by the video headset 110-1 (and display(s) 116) when the participant 102-1 speaks or utters the voice command associated with the voice-enabled UI object.

For example, if participant 102-1 is not currently an active speaker for the video conference involving participants 102-2 and 102-3 and says the word "Mute" while looking directly or gazing at a "Mute" UI button displayed for an interactive environment provided via video headset 110-1 (and video display(s) 116), then video conference application 120 (configured for video headset 110-1 and/or computing device 130-1) and/or video conference service 104 can put participant 102-1 on mute and can inhibit or prevent the other video conference participants 102-2 and 102-3 from hearing the word "Mute," in accordance with various embodiments herein. Such a feature would allow a hands-free user to interact with the video conference UI buttons and menu items without causing a distraction for the other participants of the video conference. While it may be possible to provide similar features using gestures via a video headset, such features would likely not be an option for certain users that may have limited physical accessibility to provide such gestures and would, thus, benefit from a true hands-free experience.

Consider an operational example for inhibiting a voice command that is spoken by participant 102-1 from being heard from the other participants 102-2 and 102-3 of the video conference, as discussed with reference to FIGS. 2A and 2B. FIGS. 2A and 2B are diagrams illustrating example features of an example interactive environment 200 that may be provided by video headset 110-1 in which the interactive environment 200 may include one or more voice-enabled UI objects that can be activated or otherwise utilized by participant 102-1 that is utilizing the video headset 110-1 for the video conference, according to an example embodiment.

As illustrated in FIG. 2A, video headset 110-1 can display interactive environment 200 via video display(s) 116 in which the interactive environment may include interactive objects 210 (which can include any combination of AR and/or VR interactive elements/objects) with which the participant 102-1 can interact during the video conference. Additionally, interactive environment 200 may include one or more voice-enabled UI objects 220, each of which can be associated with a particular voice command (or a particular set of voice commands) that can be uttered or spoken by participant 102-1 in order to cause the video conference application 120 to perform one or more actions within the video conference.

In at least one example, the voice-enabled UI objects 220 may include a "Mute" voice-enabled UI object 220-1, a "Share Content" voice-enabled UI object 220-2, and a "Hang-Up" voice-enabled UI object 220-3. The "Mute" voice-enabled UI object 220-1 may be associated with a "Mute" voice command that can be spoken by participant 102-1 in order cause the participant 102-1 and/or any background noise that may be produced by the participant's environment to be muted during the video conference while the "Mute" feature is enabled/activated. The "Share Content" voice-enabled UI object 220-2 may be associated with a "Share Content" voice command that can be spoken by participant 102-1 in order to share content (e.g., notes displayed via a virtual whiteboard interactive object) during the video conference while the "Share Content" feature is enabled/activated. The "Hang-Up" voice-enabled UI object 220-3 may be associated with a "Hang-up" voice command that can be spoken by participant 102-1 in order to end the video conference with the other participants 102-2 and 102-3.

During operation, any of control logic 118, video conference application 120 of video headset 110-1, video conference application 120 of computing device 130-1, and/or video conference service 104 (e.g., a cloud component) may receive or obtain eye tracking/gaze details generated by the video headset 110-1 (e.g., eye tracking/gaze details/information generated via video camera(s) 112) in relation to the voice-enabled UI objects 220-1, 220-2, and 220-3, in order to determine when the participant is looking/gazing at a particular voice-enabled UI object 220-1, 220-2, or 220-3 (e.g., a UI button, a UI menu item, etc.). While the participant 102-1 is looking/gazing at a particular voice-enabled UI object, say, for example, gazing/looking at the "Share Content" voice-enabled UI object 220-2 as shown at 222 in FIG. 2B, and it is determined that the participant 102-1 is not currently an active speaker for the video conference, a media stream generated for the participant 102-1 (e.g., media stream 122-1) can be examined/analyzed to determine whether the participant has spoken a voice command associated with the particular voice-enabled UI object at which the participant is looking/gazing.

In one embodiment, any of control logic 118, video conference application 120 of video headset 110-1, video conference application 120 of computing device 130-1, and/or video conference service 104 can determine whether participant 102-1 is or is not currently an active speaker by monitoring audio obtained for the participant 102-1 via audio I/O device(s) 114 to determine if a volume of audio for the participant 102-1 satisfies (e.g., is greater than or is greater than or equal to) a particular "active speaker" threshold, such as 36 decibels (dB) or the like. If it is determined that the volume of audio for participant 102-1 does not satisfy the "active speaker" threshold, then it can be determined that participant 102-1 is not an active speaker for the video conference.

If it is determined that the participant 102-1 has spoken a voice command associated with the particular voice-enabled UI object at which the participant is looking/gazing and that the participant 102-1 is not an active speaker for the video conference, the spoken voice command can be inhibited or otherwise prevented from being heard by the other participants 102-2 and 102-3 for the video conference. For example, for the "Share Content" voice-enabled UI object 220-2 at which it is determined that the participant 102-1 is gazing/looking at (as generally shown at 222), if it is further determined that the participant is not an active speaker for the video conference and has spoken the "Share Content" voice command, as generally shown at 224, then the spoken voice command, "Share Content" can be inhibited or otherwise prevented from being heard by the other participants 102-2 and 102-3 for the video conference.

In one embodiment, inhibiting/preventing the spoken voice command from being heard by the other participants 102-2 and 102-3 could include removing (e.g., by control logic 118, any video conference application 120, and/or video conference service 104) the particular voice command that is spoken by the participant 102-1 from the media stream that is provided to the other participants 102-2 and 102-3, such as removing the voice command from media stream 122-2 for participant 102-2 and from media stream 122-3 for participant 102-3 so that the other video conference participants 102-2 and 102-3 would not hear the spoken voice command.

In one embodiment, inhibiting/preventing the spoken voice command from being heard by the other participants 102-2 and 102-3 could include automatically muting the participant 102-1 for the particular voice command if it is determined (e.g., by control logic 118, any video conference application 120, and/or video conference service 104) that the participant 102-1 has looked/gazed at the particular voice-enabled UI object for a threshold amount of time (e.g., 1000-2000 milliseconds). In such an embodiment, the participant 102-1 could be automatically unmuted for the particular voice command if the participant 102-1 is determined to no longer be looking at/gazing towards the particular voice-enabled UI object. For example, if the spoken voice command was not a "Mute" voice command and the participant 102-1 was originally unmuted, then if it is determined that the participant 102-1 is no longer looking/gazing at the particular voice-enabled UI object, the participant 102-1 would be automatically unmuted if the particular voice command is spoken by the participant 102-1. However, if the participant 102-1 was already on mute when the voice command was spoken for the particular voice-enabled UI object, then one or more actions for the voice-enabled UI object could be performed without having to alter the media streams for the participants, since the other participants 102-2 and 102-3 would already not be able to hear the participant 102-1.

One or more actions associated with a particular voice-enabled UI object could be performed for the video conference for the participant 102-1 regardless of whether the spoken voice command was removed from the media streams for the other participants 102-2 and 102-3 (e.g., media streams 122-2 and 122-3) or whether the participant 102-1 was automatically muted for the spoken voice command. For example, for the "Share Content" example, discussed above, the participant 102-1 may share one or more "notes" for the video conference with the other participants 102-2 and 102-3 that can be displayed via a virtual whiteboard interactive object for the video conference but the participants 102-2 and 102-3 would not hear the participant 102-1 uttering/speaking the "Share Content" voice command, in accordance with embodiments herein.

It is to be understood that if the participant 102-1 spoke the "Mute" voice command while not being an active speaker and looking at/gazing toward the "Mute" voice-enabled UI object 220-1 (potentially for a threshold amount of time) then the participant 102-1 would remain muted for both the spoken voice command and thereafter until the "Mute" feature was disabled/deactivated. Further, if the participant 102-1 is muted, the participant 102-1 would still be able to use voice commands via the video headset 110-1 in accordance with embodiments herein but the media streams would not need to be altered to remove any such voice commands from the streams.

If the participant 102-1 is determined to not be looking/gazing at any particular voice-enabled UI object or is determined to be an active speaker for the video conference, then the participant 102-1 speaking a given voice command that may be associated with any voice-enabled UI object 220-1, 220-2, or 220-3 would be heard by the other participants 102-2 and 102-3 and one or more actions associated with any of the voice-enabled UI objects would not be performed within the video conference (e.g., the participant would not be muted, the participant would not share content, etc.).

Although only three types of voice-enabled UI objects/voice commands are discussed for examples herein, it is to be understood that embodiments herein could be provided for any voice-enabled UI objects/elements/etc. and corresponding voice command(s). that may be provided for any AR/VR interactive environment for a video headset. Accordingly, inhibiting/preventing a voice command utterance from being heard by participants of a video conference could be used in combination with any video conference features for a participant that may want to stay unmuted but continue to use the voice command interface without distracting other participants (e.g., to share content with the participants, etc.).

In addition to inhibiting or otherwise preventing a spoken voice command for a voice-enabled UI object/element from being heard by other participants of a video conference when the speaking participant is determined not to be an active speaker and is gazing/looking at a given voice-enabled UI object, embodiments herein may also provide for the ability to remove a spoken voice command for a voice-enabled UI object element (when a participant is determined not to be an active speaker and is gazing/looking at a given voice-enabled UI object) for any multimedia recording of the video conference, for any transcript of the video conference, and/or for any captioning that may be provided to other participants of the video conference.

Accordingly, if it is determined that a participant in a video conference that is utilizing a video headset is looking at or gazing towards a particular voice-enabled UI object and speaks a voice command associated with the voice-enabled UI object while the participant is not an active speaker for the video conference, then various techniques herein may provide for the ability to inhibit or prevent the spoken voice command from being heard by other participants of the video conference.

In addition to inhibiting or preventing voice commands from being heard by various participants in a video conference, techniques herein may further facilitate various UI features for a video conference participant that is utilizing a video headset. For example, referring to FIGS. 3A and 3B, FIGS. 3A and 3B are diagrams illustrating example features of an interactive environment 300 that may be provided by a video headset, such as video headset 110-1 or 110-2.

In some instances, while a participant in a video conference, such as participant 102-1 wearing video headset 110-1, is gazing at a voice-enabled UI object (e.g., button, menu item, etc.), the video headset may visually pop-up the voice-enabled UI object (e.g., pop-up a button or select options for a menu option). For example, as shown in FIG. 3A, in some instances if participant 102-1 is determined to be looking at or gazing towards a "Hang-Up" voice-enabled UI object 320-1, as generally shown at 322, then the video headset 110-1 may cause the UI object to pop-up or become visually enlarged, as generally shown at 324.

Such pop-up behavior may be distracting to a participant that is an active speaker for a video conference. Thus, in accordance with at least one embodiment herein as illustrated in FIG. 3B, if it is determined that participant 102-1 is looking/gazing at a particular voice-enabled UI object, such as looking/gazing at voice-enabled UI object 320-1, as generally illustrated at 322, and it is determined that participant 102-1 is an active speaker for the video conference, as generally shown at 326, then the video headset could disable the pop-up functionality with regard to the participant looking/gazing at the voice-enabled UI object, as generally shown at 328. Disabling the pop ups while the participant is the active speaker may be desirable so that the pop ups do not distract their train of thought while speaking in the meeting. In some embodiments, such a feature of disabling pop-ups may be a user configurable option for a video headset and/or a video conference application.

Figure 4:
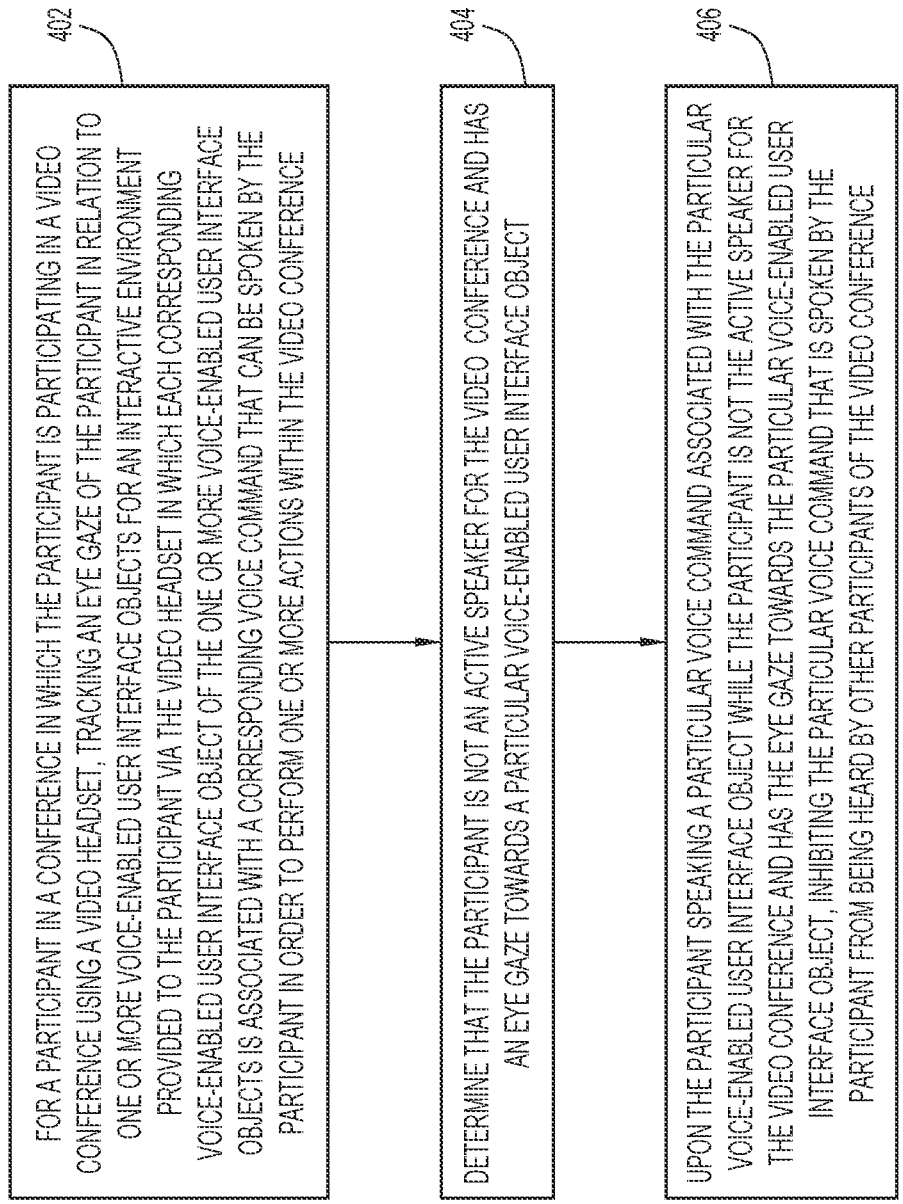
FIG. 4 is a flowchart depicting a method according to an example embodiment.

Referring to FIG. 4, FIG. 4 is a flowchart depicting a method according to an example embodiment. In at least one embodiment, method 400 may be associated with techniques that may be utilized to facilitate inhibiting or preventing voice commands spoken by a particular participant of a video conference from being heard by other participants of the video conference based on eye gaze tracking for a video headset utilized by the particular participant. In various embodiments, method 400 may be performed by a computing device or combination of computing devices, such as any of a video headset utilized by a particular participant of a video conference (e.g., video headset 110-1 or video headset 110-2 as shown in FIG. 1), a computing device or devices utilized in combination with the video headset, a video conference application (or multiple instances thereof) utilized in combination with the video headset, and/or a video conference service.

At 402, the method may include, for a participant in a conference in which the participant is participating in a video conference using a video headset, tracking an eye gaze of the participant in relation to one or more voice-enabled user interface objects for an interactive environment provided to the participant via the video headset in which each corresponding voice-enabled user interface object of the one or more voice-enabled user interface objects is associated with a corresponding voice command that can be spoken by the participant in order to perform one or more actions within the video conference.

At 404, the method may include determining that the participant is not an active speaker for the video conference and has an eye gaze towards a particular voice-enabled user interface object.

At 406, the method may include, upon the participant speaking a particular voice command associated with the particular voice-enabled user interface object while the participant is not the active speaker for the video conference and has the eye gaze towards the particular voice-enabled user interface object, inhibiting the particular voice command that is spoken by the participant from being heard by other participants of the video conference.

In one embodiment, the inhibiting may include removing the particular voice command that is spoken by the participant from a media stream of the video conference that is provided to the other participants of the video conference.

In one embodiment, the inhibiting may include automatically muting the participant for the particular voice command that is spoken by the participant upon determining that the participant has the eye gaze towards the particular voice-enabled user interface object for a threshold amount of time. In one instance, such an embodiment may further include automatically unmuting the participant for the voice command upon determining that the participant does not have the eye gaze towards the particular voice-enabled user interface object.

Figure 5:
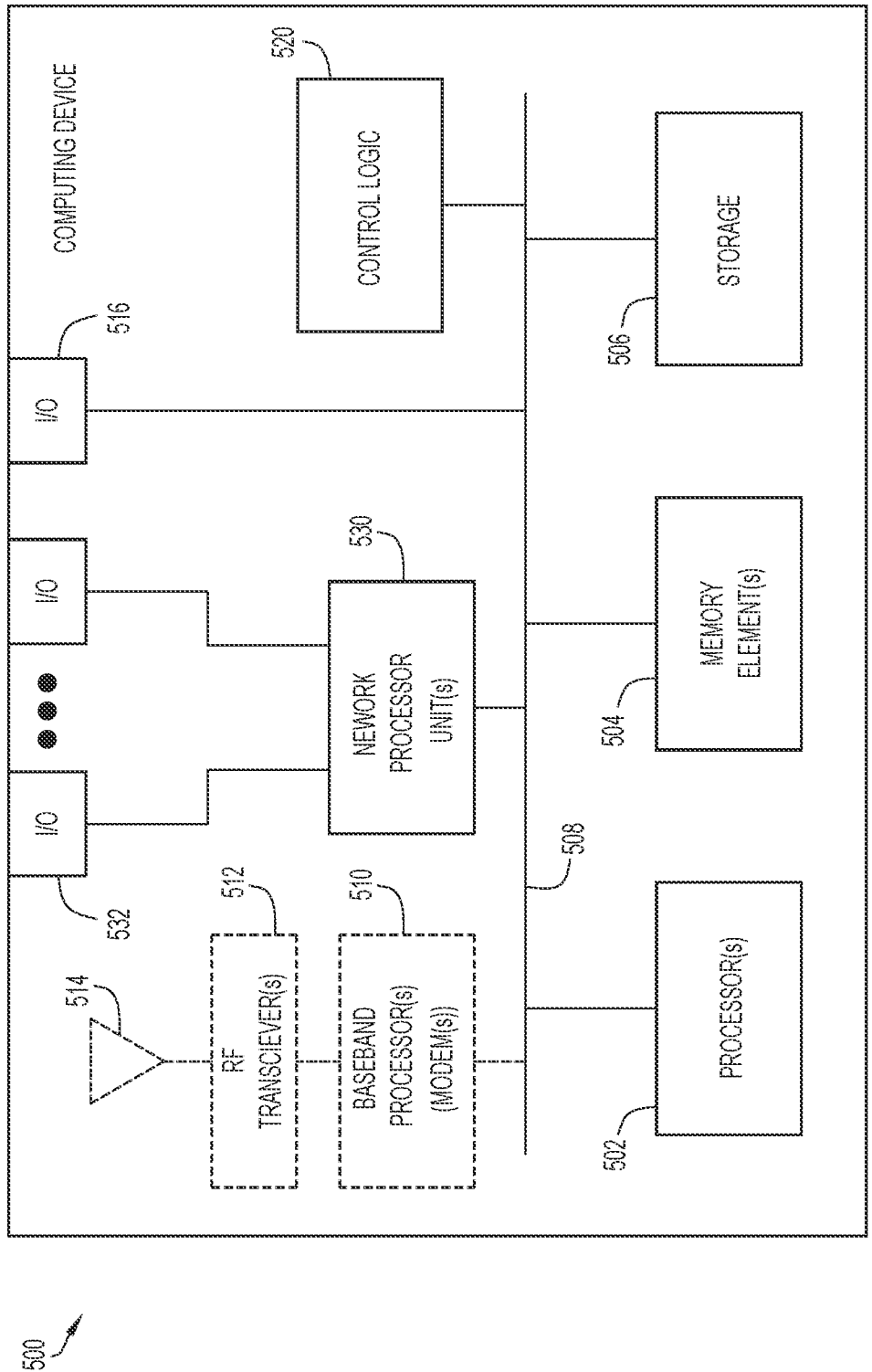
FIG. 5 is a hardware block diagram of a computing device that may perform functions associated with any combination of operations discussed in connection with techniques described for embodiments herein.

Referring to FIG. 5, FIG. 5 illustrates a hardware block diagram of a computing device 500 that may perform functions associated with operations discussed herein in connection with the techniques depicted in FIGS. 1, 2A, 2B, 3A, 3B, and 4. In various embodiments, a computing device or apparatus, such as computing device 500 or any combination of computing devices 500, may be configured as any entity/entities as discussed for the techniques depicted in connection with FIGS. 1, 2A, 2B, 3A, 3B, and 4 in order to perform operations of the various techniques discussed herein.

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein.

For embodiments in which computing device 500 may be implemented as any device capable of wireless communications, computing device 500 may further include at least one baseband processor or modem 510, one or more radio RF transceiver(s) 512 (e.g., any combination of RF receiver(s) and RF transmitter(s)), one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 500 is implemented as a wireless device or any apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include, for a participant in a conference in which the participant is participating in a video conference using a video headset, tracking an eye gaze of the participant in relation to one or more voice-enabled user interface objects for an interactive environment provided to the participant via the video headset, wherein each corresponding voice-enabled user interface object of the one or more voice-enabled user interface objects is associated with a corresponding voice command that can be spoken by the participant in order to perform one or more actions within the video conference; determining that the participant is not an active speaker for the video conference and has an eye gaze towards a particular voice-enabled user interface object; and upon the participant speaking a particular voice command associated with the particular voice-enabled user interface object while the participant is not the active speaker for the video conference and has the eye gaze towards the particular voice-enabled user interface object, inhibiting the particular voice command that is spoken by the participant from being heard by other participants of the video conference. In one instance, the interactive environment is a three-dimensional (3D) virtual reality interactive environment or is a 3D augmented reality interactive environment.

In one instance, the inhibiting includes removing the particular voice command that is spoken by the participant from a media stream of the video conference that is provided to the other participants of the video conference. In one instance, the inhibiting includes automatically muting the participant for the particular voice command that is spoken by the participant upon determining that the participant has the eye gaze towards the particular voice-enabled user interface object for a threshold amount of time. In such an instance, the method may further include automatically unmuting the participant upon determining that the participant does not have the eye gaze towards the particular voice-enabled user interface object.

In one instance, the particular voice command that is spoken by the participant is one of: a mute command that is associated with muting the participant within the video conference; a hang-up command that is associated with ending the video conference for the participant; and a share content command that is associated with sharing content of the participant with the other participants within the video conference.

In at least one instance, the method may further include at least one of removing the particular voice command that is spoken by the participant from a transcript of the video conference; removing the particular voice command that is spoken by the participant from closed captioning provided to one or more of the other participants of the video conference; or removing the particular voice command from a multimedia recording of the video conference.

In one instance, the method may further include, upon determining that the participant is an active speaker for the video conference and has the eye gaze towards the particular voice-enabled user interface object, disabling a pop-up capability of the particular voice-enabled user interface object for the interactive environment provided to the participant via the video headset.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate network communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   for a participant in a conference in which the participant is participating in a video conference using a video headset, tracking an eye gaze of the participant in relation to one or more voice-enabled user interface objects for an interactive environment provided to the participant via the video headset, wherein each corresponding voice-enabled user interface object of the one or more voice-enabled user interface objects is associated with a corresponding voice command that can be spoken by the participant in order to perform one or more actions within the video conference;
   determining that the participant is not an active speaker for the video conference and has an eye gaze towards a particular voice-enabled user interface object; and
   upon the participant speaking a particular voice command associated with the particular voice-enabled user interface object while the participant is not the active speaker for the video conference and has the eye gaze towards the particular voice-enabled user interface object, inhibiting the particular voice command that is spoken by the participant from being heard by other participants of the video conference.

2. The method of claim 1, wherein the inhibiting includes removing the particular voice command that is spoken by the participant from a media stream of the video conference that is provided to the other participants of the video conference.

3. The method of claim 1, wherein the inhibiting includes automatically muting the participant for the particular voice command that is spoken by the participant upon determining that the participant has the eye gaze towards the particular voice-enabled user interface object for a threshold amount of time.

4. The method of claim 3, further comprising:
   automatically unmuting the participant for the particular voice command upon determining that the participant does not have the eye gaze towards the particular voice-enabled user interface object.

5. The method of claim 1, wherein the particular voice command that is spoken by the participant is one of:
   a mute command that is associated with muting the participant within the video conference;
   a hang-up command that is associated with ending the video conference for the participant; and
   a share content command that is associated with sharing content of the participant with the other participants within the video conference.

6. The method of claim 1, further comprising at least one of:
   removing the particular voice command that is spoken by the participant from a transcript of the video conference;
   removing the particular voice command that is spoken by the participant from closed captioning provided to one or more of the other participants of the video conference; or
   or removing the particular voice command that is spoken by the participant from a multimedia recording of the video conference.

7. The method of claim 1, further comprising:
   upon determining that the participant is an active speaker for the video conference and has the eye gaze towards the particular voice-enabled user interface object, disabling a pop-up capability of the particular voice-enabled user interface object for the interactive environment provided to the participant via the video headset.

8. The method of claim 1, wherein the interactive environment is a three-dimensional virtual reality interactive environment or is a three-dimensional augmented reality interactive environment.

9. One or more non-transitory computer readable storage media encoded with instructions that, when executed by a processor, cause the processor to perform operations, comprising:
   for a participant in a conference in which the participant is participating in a video conference using a video headset, tracking an eye gaze of the participant in relation to one or more voice-enabled user interface objects for an interactive environment provided to the participant via the video headset, wherein each corresponding voice-enabled user interface object of the one or more voice-enabled user interface objects is associated with a corresponding voice command that can be spoken by the participant in order to perform one or more actions within the video conference;
   determining that the participant is not an active speaker for the video conference and has an eye gaze towards a particular voice-enabled user interface object; and
   upon the participant speaking a particular voice command associated with the particular voice-enabled user interface object while the participant is not the active speaker for the video conference and has the eye gaze towards the particular voice-enabled user interface object, inhibiting the particular voice command that is spoken by the participant from being heard by other participants of the video conference.

10. The media of claim 9, wherein the inhibiting includes removing the particular voice command that is spoken by the participant from a media stream of the video conference that is provided to the other participants of the video conference.

11. The media of claim 9, wherein the inhibiting includes automatically muting the participant for the particular voice command that is spoken by the participant upon determining that the participant has the eye gaze towards the particular voice-enabled user interface object for a threshold amount of time.

12. The media of claim 11, wherein the instructions, when executed by a processor, cause the processor to further perform operations, comprising:

automatically unmuting the participant for the particular voice command upon determining that the participant does not have the eye gaze towards the particular voice-enabled user interface object.

13. The media of claim 9, wherein the particular voice command that is spoken by the participant is one of:
   a mute command that is associated with muting the participant within the video conference;
   a hang-up command that is associated with ending the video conference for the participant; and
   a share content command that is associated with sharing content of the participant with the other participants within the video conference.

14. The media of claim 9, wherein the instructions, when executed by a processor, cause the processor to further perform operations, comprising at least one of:
   removing the particular voice command that is spoken by the participant from a transcript of the video conference;
   removing the particular voice command that is spoken by the participant from closed captioning provided to one or more of the other participants of the video conference; or
   or removing the particular voice command that is spoken by the participant from a multimedia recording of the video conference.

15. The media of claim 9, wherein the instructions, when executed by a processor, cause the processor to further perform operations, comprising:
   upon determining that the participant is an active speaker for the video conference and has the eye gaze towards the particular voice-enabled user interface object, disabling a pop-up capability of the particular voice-enabled user interface object for the interactive environment provided to the participant via the video headset.

16. A system comprising:
   at least one memory element for storing data; and
   at least one processor for executing instructions associated with the data, wherein executing the instructions causes the system to perform operations, comprising:
      for a participant in a conference in which the participant is participating in a video conference using a video headset, tracking an eye gaze of the participant in relation to one or more voice-enabled user interface objects for an interactive environment provided to the participant via the video headset, wherein each corresponding voice-enabled user interface object of the one or more voice-enabled user interface objects is associated with a corresponding voice command that can be spoken by the participant in order to perform one or more actions within the video conference;
      determining that the participant is not an active speaker for the video conference and has an eye gaze towards a particular voice-enabled user interface object; and
      upon the participant speaking a particular voice command associated with the particular voice-enabled user interface object while the participant is not the active speaker for the video conference and has the eye gaze towards the particular voice-enabled user interface object, inhibiting the particular voice command that is spoken by the participant from being heard by other participants of the video conference.

17. The system of claim 16, wherein the inhibiting includes removing the particular voice command that is spoken by the participant from a media stream of the video conference that is provided to the other participants of the video conference.

18. The system of claim 16, wherein the inhibiting includes automatically muting the participant for the particular voice command that is spoken by the participant upon determining that the participant has the eye gaze towards the particular voice-enabled user interface object for a threshold amount of time.

19. The system of claim 16, wherein the particular voice command that is spoken by the participant is one of:
   a mute command that is associated with muting the participant within the video conference;
   a hang-up command that is associated with ending the video conference for the participant; and
   a share content command that is associated with sharing content of the participant with the other participants within the video conference.

20. The system of claim 16, wherein executing the instructions causes the system to perform further operations, comprising at least one of:
   removing the particular voice command that is spoken by the participant from a transcript of the video conference;
   removing the particular voice command that is spoken by the participant from closed captioning provided to one or more of the other participants of the video conference; or
   or removing the particular voice command that is spoken by the participant from a multimedia recording of the video conference.

* * * * *